United States Patent Office 3,330,866
Patented July 11, 1967

3,330,866
N-(3'-HYDROXY ALKYL)-3,4,5-TRIMETHOXY-
BENZOIC ACID ALKYL AMIDES
Kurt Schmidt, Zell, near Esslingen (Neckar), Germany, assignor to Krewel-Leuffen G.m.b.H., a joint-stock company
No Drawing. Filed Nov. 4, 1963, Ser. No. 321,329
Claims priority, application Germany, Nov. 6, 1962, K 48,150
10 Claims. (Cl. 260—559)

This invention relates to improvements in the production of N-(3'-hydroxy alkyl)-3,4,5-trimethoxybenzoic acid alkyl amides.

A number of amides of 3,4,5-trimethoxybenzoic acid are known which exercise pharmacological actions on the central nervous system. The morpholide of this acid, for example, is a substance which a markedly depressive action on the central nervous system (cf. J. Borsy, Archives Internationales de Pharmacodynamie et de Thérapie, vol. 126 (1960), pp. 426–453).

It has now been found that the central nervous system is powerfully affected by N-(3'-hydroxy alkyl)-3,4,5-trimethoxybenzoic acid amides of the general formula

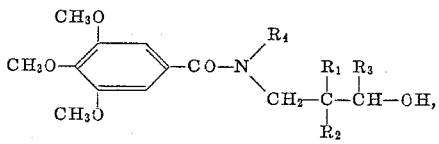

in which $R_1$ and $R_2$ may or may not be the same and indicate a saturated or unsaturated alkyl residue, an aralkyl residue or an aryl residue or a common methylene chain forming a carbocyclic ring having 4 to 6 carbon atoms, $R_3$ represents a hydrogen atom or a methyl group and $R_4$ represents a hydrogen atom, an alkyl residue or an aralkyl residue. These new amides are produced by the conversion of 3-hydroxy alkyl amines of the general formula

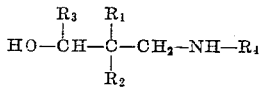

in which the residues $R_1$, $R_2$ $R_3$ and $R_4$ have the same significance as above, with 3,4,5-trimethoxybenzoyl chloride.

The following may be considered, for example, as combinations of the $R_1$ and $R_2$ residues: ethyl-ethyl, ethyl-propyl, ethyl-butyl, ethyl-benzyl, ethyl-phenyl, ethyl-allyl, methyl-propyl, methyl-allyl, pentamethylene, tetramethylene, while $R_4$ may stand, for example, for methyl, ethyl, propyl, butyl, cyclohexyl, benzyl or β-phenyl ethyl.

The acylation of the amines with 3,4,5-trimethoxybenzoyl chloride is carried out in the usual way in the presence of alkaline agents, such as sodium hydroxide or sodium carbonate, or tertiary organic bases, such as pyridine or triethylamine. Using alkaline hydroxides or alkaline carbonates as hydrochloric acid acceptors, it is advantageous to work with a two-phase system of water and an organic solvent that is immiscible with water, such as benzene, chloroform or ether. Using organic bases, it is best to work with a single-phase system, using ether, a chlorinated hydrocarbon or an aromatic hydrocarbon as a solvent. It is also advantageous to carry out the reaction, with cooling and vigorous stirring, by adding a solution of the trimethoxybenzoyl chloride to the 3-hydroxy-alkyl amine mixed with alkali or organic base.

N-(3'-hydroxy-2'-ethyl - 2' - n - butyl-propyl)-3,4,5-trimethoxybenzoic acid amide may be taken as an example to show the powerful central action of the new compounds as compared with the 3,4,5-trimethoxybenzoic acid morpholide. The new compound has a subcutaneous toxicity ($LD_{50}$), expressing the quantity of the substance which causes the death of 50% of the experimental animals (white mice) within 24 hours, of 2,450 mg. per kg. weight of experimental animals. For the substance already known, the morphalide derivative, an $LD_{50}$ of 2,120 mg. per kg. was found. The testing of the centrally depressive effect was carried out by means of the test described in 1948 by Winter for the intensification of hexobarbital sleep. With a 5% dosage of the $LD_{50}$, a 170 percent prolongation of sleep was induced by the new substance after half an hour and a 367 percent prolongation after 2 hours. The morpholide of trimethoxybenzoic acid produces a sleep prolongation of 125 percent after half an hour and of 110% after 2 hours. Using dosages of 1% and 2% of the $LD_{50}$, the sleep-prolonging action of the new substance is similarly more than twice as great as with the existing substance (63 percent as against 26 percent and 100% as again 47 percent).

EXAMPLE 1

*N-(3'-hydroxy-2',2'-diethyl-propyl)-3,4,5-trimethoxy-benzoic acid amide*

26.2 g. of 3-hydroxy-2,2-diethyl-propyl amine and a solution of 8 g. of sodium hydroxide in 100 ml. of water were mixed. While cooling with ice and stirring, a benzene solution of trimethoxybenzoyl chloride produced from 42.5 g. of 3,4,5-trimethoxybenzoic acid and thionyl chloride was dripped into the mixture. After about an hour, the reaction mixture was heated to room temperature, the phases separated, the aqueous phase was again shaken out and the combined organic phases were evaporated. The crystallized residue was re-crystallized from alcohol water. An amide of melting point 88° C. was obtained. Yield 45%.

EXAMPLE 2

*N-(3'-hydroxy-2'-ethyl-2'-n-butyl-propyl)-3,4,5-trimethoxybenzoic acid amide*

19 g. of 3-hydroxy-2-ethyl-2-n-butyl-propyl amine was dissolved in 100 ml. of ether. To this was added a solution of 4.6 g. of sodium hydroxide in 50 ml. of water. Stirring and cooling with ice, 26.7 g. of 3, 4, 5-trimethoxybenzoyl chloride dissolved in 250 ml. of ether was then added. After a reaction time of two hours, the work was completed in the manner of Example 1. The amide obtained with a 50%–70% yield had a melting point of 114° C.–116° C. (ex. alcohol-water).

EXAMPLE 3

*N-(3'-hydroxy-2',2'-diethyl-butyl)-3,4,5-trimethoxybenzoic acid amide*

1.4 g. of 3-hydroxy-2,2-diethyl-butyl amine was dissolved in 10 cc. of a 1-molar benzene solution of triethyl amine. While cooling and stirring, 10 cc. of a 1-molar benzene solution of 3,4,5-trimethoxybenzoyl chloride was dripped in and stirred for a further half hour at room temperature. The reaction mixture was filtered and freed from unconverted original substance by shaking with alkalis and mineral acid. The solvent was evaporated off and the residue re-crystallized. An amide of melting point 114° C. (ex. alcohol-water) was obtained, with a yield of 75%.

EXAMPLE 4

In the same way as in Example 3, from 3-hydroxy-2-ethyl-2-allyl-propyl amine and trimethoxybenzoyl chloride, the N-(3'-hydroxy-2'-ethyl-2'-allyl-propyl)-3,4,5-trimethoxybenzoic acid amide was obtained, of melting point 74° C. (ex. benzene), with a yield of 65%.

EXAMPLE 5

In the same way as in Example 3, from N-(3-hydroxy-2-ethyl-2-phenyl-propyl)-propylamine and trimethoxybenzoyl chloride, the N-propyl-N-(3'-hydroxy-2'-ethyl-2'-phenyl-propyl)-3,4,5-trimethoxybenzoic acid amide was obtained, of melting point 125° C.–126° C. (ex. alcohol-water), with a yield of 70%.

EXAMPLE 6

In the same way as in Example 3, from N-(3-hydroxy-2-ethyl-2-phenyl-propyl)-benzyl amine and 3,4,5-trimethoxybenzoyl chloride, the N-benzyl-N-(3'-hydroxy-2'-ethyl-2'-phenyl-propyl)-3,4,5-trimethoxybenzoic acid amide was obtained, of melting point 149° C.–151° C. (ether), with a yield of 50%.

EXAMPLE 7

In the same way as in Example 3, from 1-aminomethyl-1-hydroxymethyl-cyclohexane and trimethoxybenzoyl chloride, the N-(3'-hydroxy-2',2'-pentamethylene-propyl)-3,4,5-trimethoxybenzoic acid amide was obtained, of melting point 123° C.–125° C. (ether), with a yield of 55%.

EXAMPLE 8

35.8 g. of 3-amino-2-phenyl-2-ethyl propanol-1 was dissolved in 50 ml. of benzene and mixed with a solution of 8 g. of sodium hydroxide in 100 ml. of water. 46 g. of trimethoxybenzoyl chloride (in 180 ml. of benzene) was dripped in, while cooling and stirring. This was then left to stand for an hour at room temperature and the phases were separated. After disposing of the solvent, the residue was dissolved in a large volume of hot water. The N-(3'-hydroxy-2'-phenyl-2'-ethyl-propyl)-3,4,5-trimethoxybenzoic acid amide crystallized with one molecule water, and had a melting point of 75° C. A yield of 25.4% was obtained. The anhydrous product is a glassily viscous mass.

I claim:
1. A 3,4,5-trimethoxybenzoic acid amide of the formula

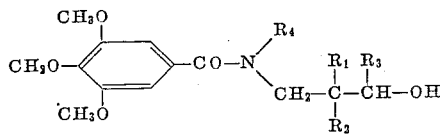

where $R_1$ and $R_2$ are saturated lower alkyl groups, lower alkenyl groups, phenyl-lower-alkyl groups, phenyl groups, or common methylene chains of 4 to 6 carbon atoms, $R_3$ is hydrogen or a methyl group and $R_4$ is hydrogen, lower alkyl group or phenyl-lower-alkyl group.

2. The compound of claim 1 in which $R_1$ and $R_2$ are respectively ethyl-ethyl, ethyl-propyl, ethyl-butyl, ethyl-benzyl, ethyl-phenyl, ethyl-allyl, methyl-propyl, methyl-propyl, methyl-allyl, or $R_1$ and $R_2$ taken together are pentamethylene or tetramethylene, $R_3$ is hydrogen or methyl, and $R_4$ is methyl, ethyl, propyl, butyl, cyclohexyl, benzyl, or β-phenyl ethyl.

3. The compound of claim 1 in which $R_1$ is ethyl, $R_2$ is n-butyl, $R_3$ is hydrogen and $R_4$ is hydrogen.

4. The compound of claim 1 in which $R_1$ and $R_2$ are ethyl, $R_3$ is hydrogen and $R_4$ is hydrogen.

5. The compound of claim 1 in which $R_1$ and $R_2$ are ethyl, $R_3$ is methyl and $R_4$ is hydrogen.

6. The compound of claim 1 in which $R_1$ is ethyl, $R_2$ is allyl, $R_3$ is hydrogen and $R_4$ is hydrogen.

7. The compound of claim 1 in which $R_1$ is ethyl, $R_2$ is phenyl, $R_3$ is hydrogen and $R_4$ is propyl.

8. The compound of claim 1 in which $R_1$ is ethyl, $R_2$ is phenyl, $R_3$ is hydrogen, and $R_4$ is benzyl.

9. The compound of claim 1 in which $R_1$ and $R_2$ taken together form a pentamethylene ring, $R_3$ is hydrogen and $R_4$ is hydrogen.

10. The compound of claim 1 in which $R_1$ is phenyl, $R_2$ is ethyl, $R_3$ is hydrogen and $R_4$ is hydrogen.

References Cited
UNITED STATES PATENTS

| | | | |
|---|---|---|---|
| 2,465,067 | 3/1949 | Corner et al. | 260—559 |
| 2,870,146 | 1/1959 | Perron | 260—559 |
| 2,906,777 | 9/1959 | Denss et al. | 260—559 |
| 2,948,754 | 8/1960 | Litvan et al. | 260—559 |
| 2,987,544 | 6/1961 | Horrom | 260—559 |

OTHER REFERENCES

Noller: Chemistry of Organic Compounds, 2nd ed., pp. 237 and 244, Philadelphia, Saunders, 1958.

Schlager: Archiv. der Pharm., vol. 296, pp. 221 and 224–225 (April 1963).

WALTER A. MODANCE, *Primary Examiner.*

NATALIE TROUSOF, *Assistant Examiner.*